United States Patent
Hirashima et al.

(10) Patent No.: US 11,242,073 B2
(45) Date of Patent: Feb. 8, 2022

(54) BONE STRUCTURE OF RAILCAR AND SIDE BODYSHELL INCLUDING SAME

(71) Applicant: KAWASAKI JUKOGYO KABUSHIKI KAISHA, Kobe (JP)

(72) Inventors: Toshiyuki Hirashima, Kobe (JP); Tomoya Ishikawa, Kobe (JP); Kazumasa Inaba, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 355 days.

(21) Appl. No.: 16/339,465

(22) PCT Filed: Mar. 14, 2017

(86) PCT No.: PCT/JP2017/010184
§ 371 (c)(1),
(2) Date: Apr. 4, 2019

(87) PCT Pub. No.: WO2018/066150
PCT Pub. Date: Apr. 12, 2018

(65) Prior Publication Data
US 2019/0232979 A1    Aug. 1, 2019

(30) Foreign Application Priority Data
Oct. 4, 2016    (JP) .............................. JP2016-196238

(51) Int. Cl.
*B61D 17/08*      (2006.01)
*B61D 17/04*      (2006.01)

(52) U.S. Cl.
CPC ............ *B61D 17/08* (2013.01); *B61D 17/041* (2013.01)

(58) Field of Classification Search
CPC ...... B61D 17/00; B61D 17/04; B61D 17/041; B61D 17/048; B61D 17/08; B61D 25/00
See application file for complete search history.

(56) References Cited

U.S. PATENT DOCUMENTS 2,244,661 A * 6/1941 Christianson .......... B61D 17/08
                                                       105/397
2,572,747 A * 10/1951 Murphy ................. B61D 17/08
                                                       105/401

(Continued)

FOREIGN PATENT DOCUMENTS

CN      103879420 A      6/2014
EP       0561369 A1 *    9/1993    ............. B61D 17/08

(Continued)

*Primary Examiner* — Robert J McCarry, Jr.
(74) *Attorney, Agent, or Firm* — Oliff PLC

(57) ABSTRACT

A bone structure of a railcar includes: a pair of first lateral bones arranged at an inner side of a wainscot panel in a car width direction and extending in a car longitudinal direction, the first lateral bones being joined to the wainscot panel; and a side post arranged at an inner side of a pier panel in the car width direction and extending in a car upper-lower direction, the side post intersecting with the first lateral bones, wherein the side post includes: at least one first flange portion joined to the pier panel; a pair of cutout portions located at positions corresponding to the wainscot panel, the first lateral bones passing through the respective cutout portions in the car longitudinal direction; and at least one second flange portion arranged between the first lateral bones and joined to the wainscot panel.

6 Claims, 6 Drawing Sheets

CAR LONGITUDINAL DIRECTION

(56) References Cited

U.S. PATENT DOCUMENTS 3,631,817 A * 1/1972 O'Neill ............... B61D 17/08
                                                    105/401
2015/0291185 A1 * 10/2015 Hirashima ............ B61D 17/08
                                                    105/418

FOREIGN PATENT DOCUMENTS

| JP | S59-011062 U | 1/1984 |
| JP | S59-011957 A | 1/1984 |
| JP | S59-029355 U | 2/1984 |
| JP | H11-278258 A | 10/1999 |
| JP | 2014-083982 A | 5/2014 |
| JP | 2014-184958 A | 10/2014 |

* cited by examiner

BONE STRUCTURE OF RAILCAR AND SIDE BODYSHELL INCLUDING SAME

TECHNICAL FIELD

The present invention relates to a bone structure of a railcar and a side bodyshell including the bone structure.

BACKGROUND ART

A railcar is required to have adequate strength with respect to a load acting in a car longitudinal direction of a carbody of the railcar in consideration of head-on collision. For example, according to a side bodyshell of PTL 1, a plurality of lateral bones are joined to an outer plate at lower and upper sides of window openings, and a plurality of vertical bones are joined onto the lateral bones. In addition, flange portions of the vertical bones are joined to a pier panel located between a pair of window openings. According to this, the strength of the outer plate at the pier panel can be improved while avoiding the division of the lateral bones.

CITATION LIST

Patent Literature

PTL 1: Japanese Laid-Open Patent Application Publication No. 2014-83982

SUMMARY OF INVENTION

Technical Problem

The required strength of the carbody with respect to the above load may further increase depending on travel conditions and the like. However, simply increasing the number of reinforcing members of the side bodyshell leads to an increase in weight of the carbody, and this is not preferable.

An object of the present invention is to provide a structure which effectively improves the strength of an outer plate of a side bodyshell of a railcar and facilitates the weight reduction of a carbody of the railcar.

Solution to Problem

A bone structure of a railcar according to one aspect of the present invention is a bone structure joined to an outer plate, the outer plate including: a pair of window openings; a pier panel located between the window openings; and a wainscot panel located under the window openings and the pier panel and extending in a car longitudinal direction, the bone structure including: a pair of first lateral bones arranged at an inner side of the wainscot panel in a car width direction and extending in the car longitudinal direction, the first lateral bones being joined to the wainscot panel; and a side post arranged at an inner side of the pier panel in the car width direction and extending in a car upper-lower direction, the side post intersecting with the first lateral bones, wherein the side post includes: at least one first flange portion joined to the pier panel; a pair of cutout portions located at positions corresponding to the wainscot panel, the first lateral bones passing through the respective cutout portions in the car longitudinal direction; and at least one second flange portion arranged between the first lateral bones and joined to the wainscot panel.

According to the above configuration, the first lateral bones joined to the wainscot panel pass through the cutout portions of the side post and continuously extend in the car longitudinal direction. In addition, the side post joined to the pier panel is also joined to the wainscot panel by the second flange portion arranged between the first lateral bones. Therefore, the strength of the outer plate can be increased by this simple configuration. Especially, although a load generated in the car longitudinal direction by head-on collision of the railcar is transmitted to the side bodyshell through the underframe of the carbody, the strength of the wainscot panel is also increased together with the pier panel, so that the strength of the outer plate is effectively increased, and the weight reduction of the carbody is also facilitated.

Advantageous Effects of Invention

The present invention can provide a structure which effectively improves the strength of the outer plate of the side bodyshell of the railcar and facilitates the weight reduction of the carbody of the railcar.

DESCRIPTION OF EMBODIMENTS

Hereinafter, an embodiment will be explained with reference to the drawings. In the following explanations, a direction in which a railcar travels and a carbody extends is defined as a car longitudinal direction, and a crosswise direction perpendicular to the car longitudinal direction is defined as a car width direction. The car longitudinal direction is also referred to as a front-rear direction, and the car width direction is also referred to as a left-right direction.

Side Bodyshell

Figure 1:
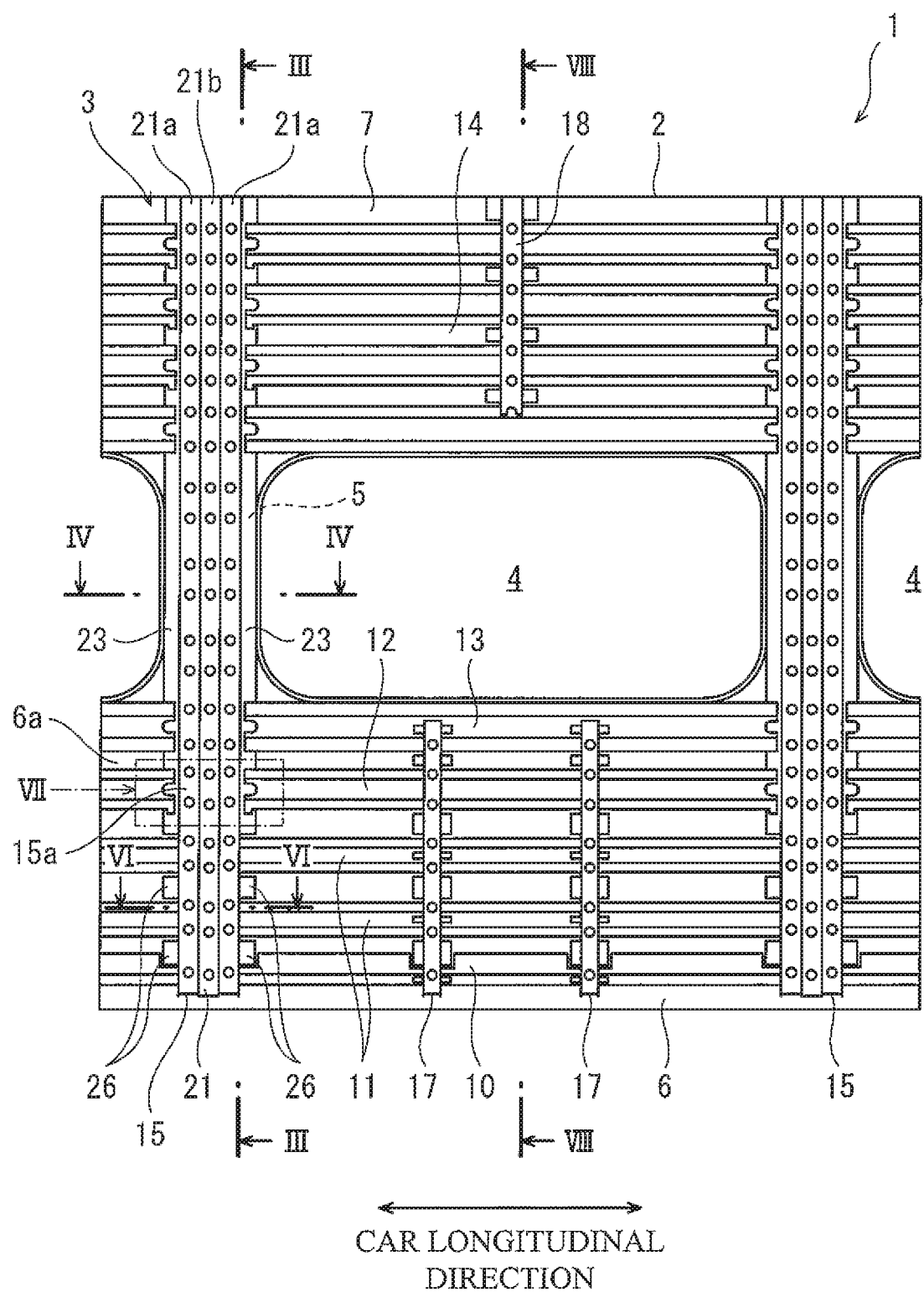
FIG. 1 is a diagram when viewing a side bodyshell of a railcar according to an embodiment from an inner side in a car width direction.
Figure 2:
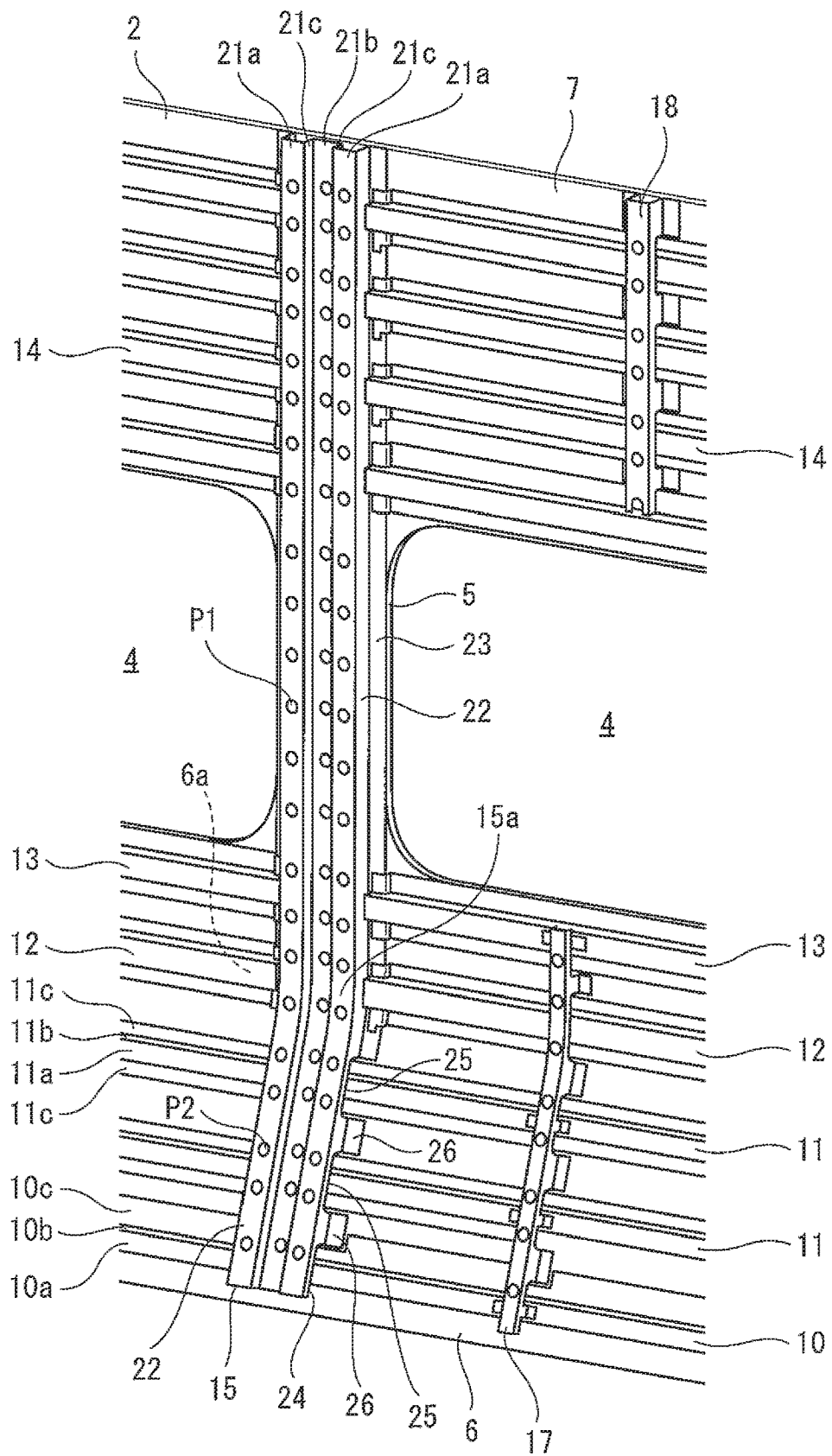
FIG. 2 is a perspective view of the side bodyshell shown in FIG. 1.

As shown in FIGS. 1 and 2, a side bodyshell 1 is a structure connecting an underframe (not shown) and a roof bodyshell (not shown) in a carbody of a railcar. The side bodyshell 1 includes an outer plate 2 and a bone structure 3. The bone structure 3 is arranged at an inner side of the outer plate 2 in the car width direction and joined to the outer plate 2. The outer plate 2 and the bone structure 3 are made of metal (such as stainless steel or aluminum alloy). The bone structure 3 is joined to the outer plate 2 by, for example, resistance welding. However, the bone structure 3 may be joined to the outer plate 2 by the other welding, such as laser welding, or by friction stir joining.

Outer Plate

The outer plate 2 includes window openings 4, pier panels 5, a wainscot panel 6, and a frieze board 7. The pier panel 5 is a part of the outer plate 2 which part is located between a pair of window openings 4. The wainscot panel 6 is located under the window opening 4 and the pier panel 5 and extends in the car longitudinal direction. The wainscot panel 6 includes a curved portion 6a that is curved inward in the car width direction when viewed from the car longitudinal direction. A lower end portion of the wainscot panel 6 is joined to the underframe (not shown) of the carbody. The frieze board 7 is located above the window opening 4 and the pier panel 5 and extends in the car longitudinal direction. An upper end portion of the frieze board 7 is joined to the roof bodyshell (not shown) of the carbody.

Outline of Bone Structure

As shown in FIGS. 1 to 5, the bone structure 3 includes first lateral bones 10 and 11, second lateral bones 12 and 13, third lateral bones 14, side posts 15, reinforcing plates 16, first intermediate posts 17, and second intermediate posts 18.

The first to third lateral bones 10 to 14 extend in the car longitudinal direction. The first lateral bones 10 and 11 and the second lateral bones 12 and 13 are joined to the wainscot panel 6, and the third lateral bones 14 are joined to the frieze board 7. The second lateral bones 12 and 13 are located between the window opening 4 and a group of the first lateral bones 10 and 11 and are joined to the wainscot panel 6. The second lateral bone 12 at a lower side is arranged so as to correspond to the curved portion 6a, and the second lateral bone 13 at an upper side is arranged along a lower edge of the window opening 4.

The first lateral bone 10 located at the lowest side among the first to third lateral bones 10 to 14 has a Z-shaped section when viewed from the car longitudinal direction. Specifically, the first lateral bone 10 includes a top portion 10a, a web portion 10b, and a flange portion 10c. The top portion 10a is located away from the outer plate 2 inward in the car width direction and extends along the outer plate 2. The web portion 10b extends from one car upper-lower direction end (for example, an upper end) of the top portion 10a toward the outer plate 2. The flange portion 10c projects along the outer plate 2 from an end portion, located close to the outer plate 2, of the web portion 10b toward an opposite side of the top portion 10a. The flange portion 10c of the first lateral bone 10 is joined to the outer plate 2.

Each of the first to third lateral bones 11 to 14 that are the lateral bones other than the first lateral bone 10 located at the lowest side has a hat-shaped section when viewed from the car longitudinal direction. Specifically, the first lateral bone 11 includes a top portion 11a, a pair of web portions 11b, and a pair of flange portions 11c. The top portion 11a is located away from the outer plate 2 inward in the car width direction and extends along the outer plate 2. The web portions 11b extends from both respective car upper-lower direction ends of the top portion 11a toward the outer plate 2. The flange portions 11c projects from respective end portions, located close to the outer plate 2, of the web portions 11b along the outer plate 2 toward respective directions away from each other. The flange portions 11c of the first lateral bone 11 are joined to the outer plate 2. It should be noted that each of the second lateral bones 12 to 14 has the same section as above, and a pair of flange portions of each of the second lateral bones 12 to 14 are joined to the outer plate 2.

The side post 15 is located at the same position as the pier panel 5 in the car longitudinal direction. The side post 15 extends in a car upper-lower direction and joined to the outer plate 2. In the present embodiment, the pier panel 5 and the side post 15 are substantially the same in width as each other. However, the present embodiment is not limited to this. The side post 15 and each of the first lateral bones 10 and 11 intersect with each other such that the first lateral bones 10 and 11 penetrate the side post 15 in the car longitudinal direction. Each of the second and third lateral bones 12 to 14 is discontinuous at a position where the side post 15 is arranged. Details will be described later. The side post 15 includes a curved portion 15a. The curved portion 15a is curved inward in the car width direction along the curved portion 6a and is located at a position where the side post 15 is joined to the curved portion 6a of the wainscot panel 6.

A plurality of reinforcing plates 16 (see FIG. 5) described below are arranged in an internal space S formed by the side post 15 and the outer plate 2. The plurality of reinforcing plates 16 include: reinforcing plates each located at the same position as the second lateral bone 12 or 13 in the car upper-lower direction and joined to the wainscot panel 6; reinforcing plates joined to the pier panel 5 and arranged at predetermined intervals in the upper-lower direction; and reinforcing plates each located at the same position as the third lateral bone 14 in the car upper-lower direction and joined to the frieze board 7. The first intermediate post 17 is located under the window opening 4 and extends in the car upper-lower direction so as to intersect with the first and second lateral bones 10 to 13. The first intermediate post 17 is temporarily fixed to the top portions of the lateral bones 10, 11, and 13 as described below and then joined to the wainscot panel 6. The second intermediate post 18 is located above the window opening 4 and extends in the car upper-lower direction so as to intersect with the third lateral bones 14. The second intermediate post 18 is joined to the frieze board 7.

Details of Bone Structure

As shown in FIGS. 1 to 4, the side post 15 includes a top portion 21, a pair of web portions 22, a pair of first flange portions 23, three pairs of cutout portions 24 and 25, and two pairs of second flange portions 26.

The top portion 21 is located away from the outer plate 2 inward in the car width direction and extends along the outer plate 2. The top portion 21 includes a pair of first regions 21a, a second region 21b, and a pair of third regions 21c. The first regions 21a are connected to the respective web portions 22. The second region 21b is arranged between the first regions 21a and is located closer to the outer plate 2 than the first regions 21a. The third regions 21c connect the respective first regions 21a to the second region 21b. The first regions 21a and the second region 21b are substantially parallel to the outer plate 2, and the third regions 21c are substantially perpendicular to the outer plate 2. The third region 21c is shorter than the web portion 22 in a normal direction of the outer plate 2. To be specific, the third regions 21c do not contact the outer plate 2, and a gap is formed between the third region 21c and the outer plate 2.

The web portions 22 extend from both respective car longitudinal direction ends of the top portion 21 toward the outer plate 2. To be specific, one of the web portions 22 projects toward the outer plate 2 from an end portion, located far from the second region 21b, of one of the first regions 21a, and the other web portion 22 projects toward the outer plate 2 from an end portion, located far from the second region 21b, of the other first region 21a.

Each of the first flange portions 23 is provided at a position corresponding to the pier panel 5, an upper portion of the wainscot panel 6, and the frieze board 7 and is joined to the outer plate 2 by, for example, resistance welding. The first flange portions 23 projects from respective end portions, located close to the outer plate 2, of the web portions 22 along the outer plate 2 toward respective directions away from each other. One of the first flange portions 23 is joined to one of car longitudinal direction end portions of the pier panel 5, and the other first flange portion 23 is joined to the other car longitudinal direction end portion of the pier panel 5. A width of the side post 15 in the car longitudinal direction is substantially equal to a width of the pier panel 5 in the car longitudinal direction. A lower end portion of the first flange portion 23 is curved along the curved portion 6a of the wainscot panel 6 and joined to the curved portion 6a.

Figure 3:
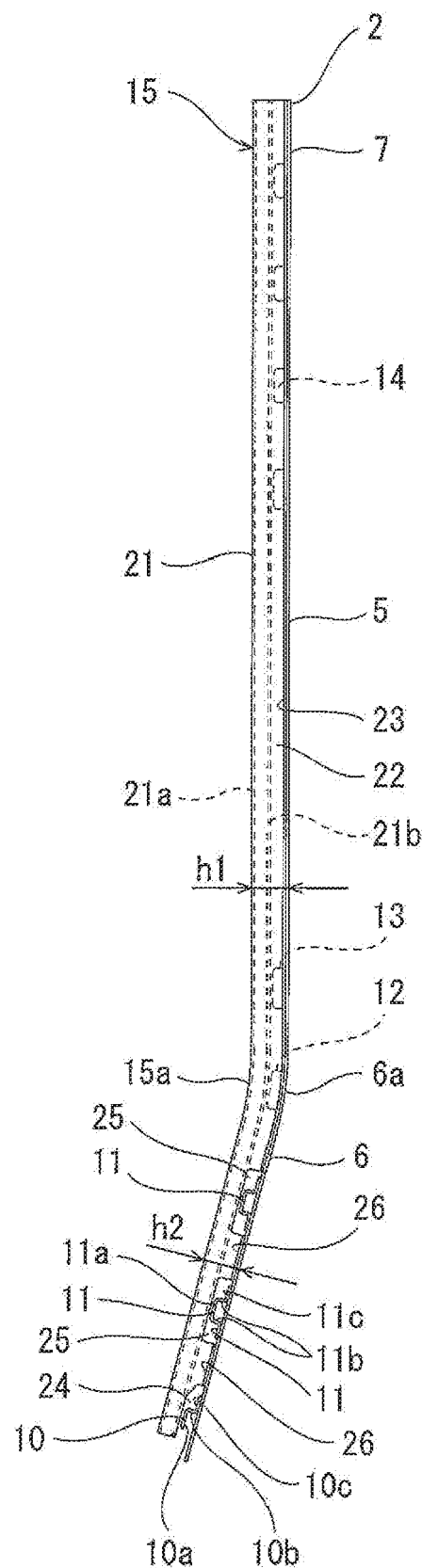
FIG. 3 is a sectional view taken along line of FIG. 1.
Figure 6:
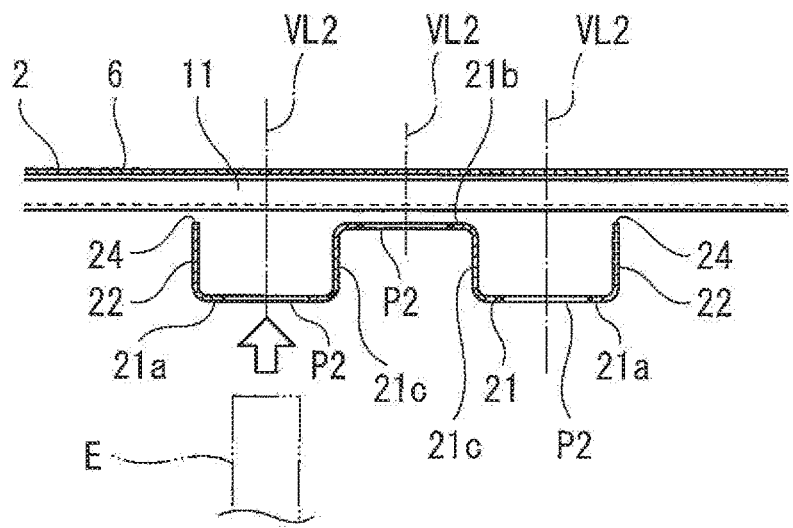
FIG. 6 is a sectional view taken along line VI-VI of FIG. 1.

As shown in FIGS. 2, 3, and 6, three pairs of cutout portions 24 and 25 are provided at a position corresponding to a portion of the wainscot panel 6 which portion is located lower than the curved portion 6a. A pair of cutout portions 24 arranged at the lowest side are formed by cutting out the web portions 22 from the outer plate 2 side and a lower side. Thus, the cutout portions 24 are open toward the outer plate 2 and the lower side. Two pairs of cutout portions 25 are arranged under the curved portion 15a and are formed by cutting out the web portions 22 from the outer plate 2 side. Thus, the cutout portions 25 are open toward the outer plate 2. The first lateral bone 10 having the Z-shaped section passes through the cutout portions 24 in the car longitudinal direction, and the first lateral bones 11 each having the hat-shaped section pass through the cutout portions 25 in the car longitudinal direction. The side post 15 is spaced apart from the first lateral bones 10 and 11 at the cutout portions 24 and 25. The side post 15 and the first lateral bones 10 and 11 do not contact each other.

Two pairs of second flange portions 26 are provided at a position corresponding to a portion of the wainscot panel 6 which portion is located lower than the curved portion 6a. The second flange portions 26 are joined to the outer plate 2 by, for example, resistance welding. A position of the second flange portion 26 in the car longitudinal direction is the same as a position of the first flange portion 23 in the car longitudinal direction. The second flange portions 26 project from respective end portions of parts, located between the cutout portions (24, 25) lined up in the upper-lower direction, of the web portions 22 along the outer plate 2 toward respective directions away from each other. The second flange portions 26 at a lower side are arranged between the first lateral bone 10 and the first lateral bone 11 located above the first lateral bone 10, and the second flange portion 26 at an upper side is arranged between the first lateral bones 11.

Figure 7:
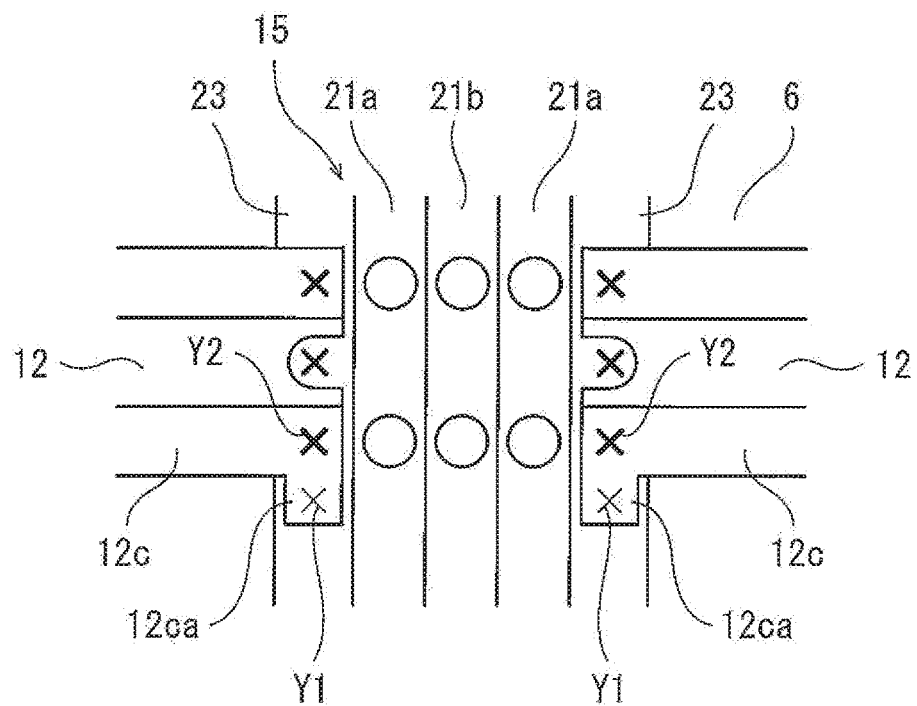
FIG. 7 is an enlarged view of a portion VII of FIG. 1.

A car longitudinal direction end surface of the second lateral bone 12 is located close to and opposed to an outer surface of the web portion 22 at the curved portion 15a of the side post 15. Similarly, car longitudinal direction end surfaces of the second lateral bone 13 and the third lateral bone 14 are located close to and opposed to the outer surface of the web portion 22 of the side post 15. To be specific, the second lateral bones 12 and 13 and the third lateral bones 14 do not penetrate the side post 15 in the car longitudinal direction. As shown in FIG. 7, one of the flange portions 12c of the second lateral bone 12 (in the present embodiment, the flange portion 12c at a lower side) includes an enlarged width portion 12ca that is wide in the car upper-lower direction. The enlarged width portion 12ca of the second lateral bone 12 is subjected to tack welding (Y1) with respect to the first flange portion 23 of the side post 15 in advance. With this, the second lateral bone 12 is first assembled to the side post 15 before being joined to the outer plate 2. Then, when welding the side post 15 and the second lateral bone 12 to the outer plate 2, normal welding (Y2) is performed at a position of the enlarged width portion 12ca different from the tack welding position Y1.

As shown in FIG. 3, a height h1 of the side post 15 at a position corresponding to the first flange portion 23 in a direction perpendicular to the outer plate 2 is equal to a height h2 of the side post 15 at a position corresponding to the second flange portion 26 in the same direction. To be specific, a distance from a portion, located closest to the outer plate 2, of the side post 15 to a portion, located farthest from the outer plate 2, of the side post 15 at the position where the flange portion 23 exists is equal to a distance from a portion, located closest to the outer plate 2, of the side post 15 to a potion, located farthest from the outer plate 2, of the side post 15 at the position where the second flange portion 26 exists. In the present embodiment, the height of the entire side post 15 in the direction perpendicular to the outer plate 2 is constant.

Figure 4:
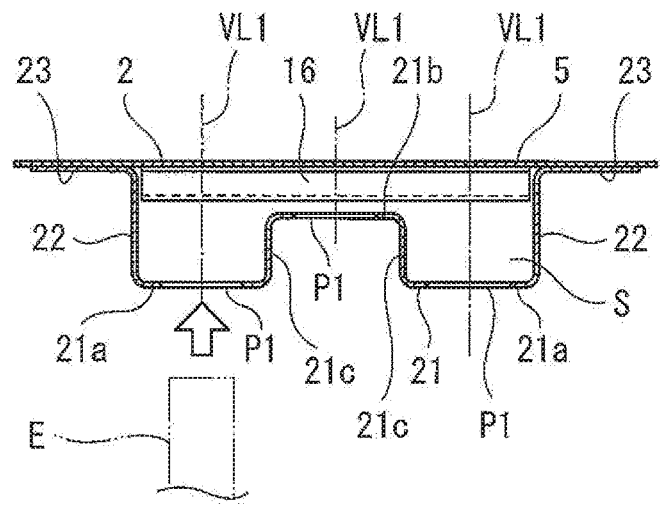
FIG. 4 is a sectional view taken along line IV-IV of FIG. 1.
Figure 5:
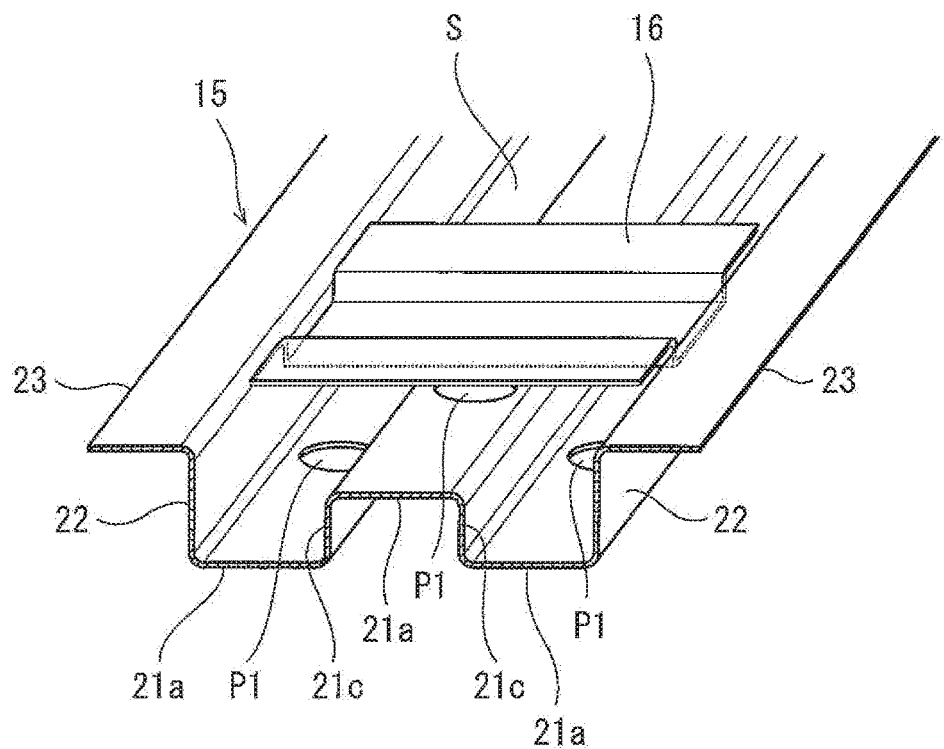
FIG. 5 is a perspective view when viewing a side post and a reinforcing plate at a position of FIG. 4 from an outer side in the car width direction.

As shown in FIGS. 4 and 5, the reinforcing plate 16 is arranged in the internal space S formed by the side post 15 and the pier panel 5 (outer plate 2). The reinforcing plate 16 is first assembled to the side post 15 before the side post 15 is joined to the outer plate 2. As one example, the reinforcing plate 16 has a hat-shaped section including a pair of flange portions 16a when viewed from the car longitudinal direction. Both car longitudinal direction end portions of the reinforcing plate 16 are joined to respective inner surfaces of the web portions 22 of the side post 15 by welding. As shown in FIG. 5, lower surfaces of the flange portions 16a of the reinforcing plate 16 and lower surfaces of the flange portions 23 of the side post 15 are flush with each other. As shown in FIGS. 1 and 4, in a range corresponding to the pier panel 5 and the upper portion of the wainscot panel 6, openings P1 for work are formed at positions on the first regions 21a and second region 21b of the top portion 21 of the side post 15, the positions corresponding to the flange portions 16a of the reinforcing plates 16. Further, the openings P1 are arranged on virtual straight lines VL1 each extending in a direction perpendicular to the outer plate 2 through a portion at which the reinforcing plate 16 and the outer plate 2 are to be joined to each other. By inserting a welding electrode E into the opening P1, the reinforcing plate 16 is joined to the outer plate 2 by resistance welding. In the present embodiment, in addition to a range corresponding to the pier panel 5, the reinforcing plates 16 are also provided in a range corresponding to the wainscot panel 6 so as to be located at the same positions as the second lateral bones 12 and 13 in the car upper-lower direction. Further, the reinforcing plates 16 are provided in a range corresponding to the frieze board 7.

Further, as shown in FIGS. 2 and 6, in a range corresponding to a lower portion of the wainscot panel 6, openings P2 for work are formed at positions on the first regions 21a and second region 21b of the top portion 21 of the side post 15, the positions corresponding to the flange portions 10c and 11c of the first lateral bones 10 and 11. Further, the openings P2 are arranged on virtual straight lines VL2 each extending in a direction perpendicular to the wainscot panel 6 through a portion at which the flange portion of the first lateral bone 10 or 11 and the wainscot panel 6 are to be joined to each other. By inserting the welding electrode E into the opening P2, the first lateral bone 10 or 11 is joined to the wainscot panel 6 by resistance welding.

Figure 8:
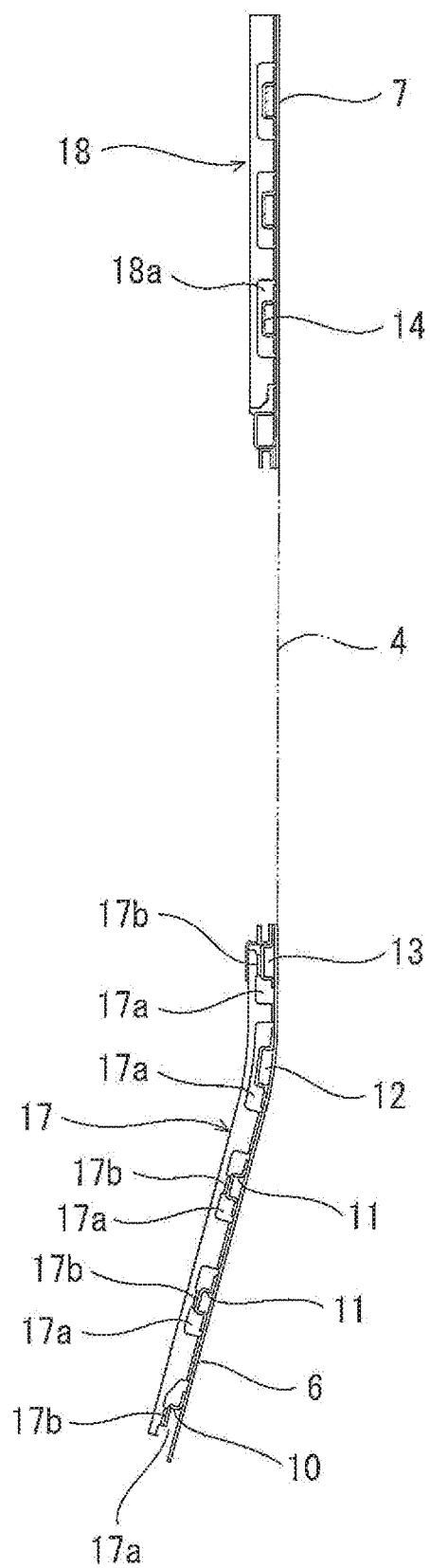
FIG. 8 is a sectional view taken along line VIII-VIII of FIG. 1.

As shown in FIGS. 1, 2, and 8, each of the first intermediate post 17 and the second intermediate post 18 has a hat-shaped section when viewed from the car upper-lower direction. The first intermediate post 17 joined to the wainscot panel 6 includes cutout portions 17a. The first lateral bones 10 and 11 and the second lateral bones 12 and 13 pass through the respective cutout portions 17a in the car longitudinal direction. The first intermediate post 17 intersects with the first lateral bones 10 and 11 and the second lateral bones 12 and 13 when viewed from the car width direction.

The second intermediate post 18 joined to the frieze board 7 includes cutout portions 18a. The third lateral bones 14 pass through the respective cutout portions 18a in the car longitudinal direction. The second intermediate post 18 intersects with the third lateral bones 14 when viewed from the car width direction. The first intermediate post 17 includes flange portions 17b joined to the respective top portions of the first lateral bones 10 and 11 and the second lateral bone 13 but is not joined to the top portion of the second lateral bone 12.

As above, the first lateral bones 10 and 11 joined to the wainscot panel 6 pass through the cutout portions 24 and 25 of the plurality of side posts 15 and continuously extend in the car longitudinal direction. In addition, the second flange portions 26 each arranged between the first lateral bones (10, 11) are also joined to the wainscot panel 6. Therefore, the strength of the outer plate 2 can be increased by this simple configuration. To be specific, although a load generated in the car longitudinal direction by head-on collision of the railcar is transmitted to the side bodyshell 1 through the underframe of the carbody, the strength in the car longitudinal direction of a portion of the wainscot panel 6 which portion is located lower than the curved portion 6a is especially increased. Further, since the side post 15 is also joined to the wainscot panel 6 by the second flange portions 26, rigidity of the wainscot panel 6 in an out-of-plane direction can be adequately secured. Furthermore, at a pier portion, the pier panel 5 and the side post 15 having substantially the same width as the pier panel 5 are joined to each other together with the reinforcing plates 16, so that the strength of the carbody with respect to shearing deformation at the time of a torsional load can be increased. It should be noted that in many cases, as with the pier panel, the degree of contribution of the frieze board to shearing deformation or out-of-plane deformation is larger than the degree of contribution of the frieze board to compressive deformation. Therefore, at the frieze board as with the pier panel, the reinforcing plates are provided in the side post, and the lateral bones are divided. However, depending on required design conditions (load conditions), as with the above wainscot panel, the side post may be provided with cutouts, and the lateral bone may continuously extend without being divided.

The height h1 of the side post 15 at the position corresponding to the first flange portion 23 in the direction perpendicular to the outer plate 2 is equal to the height h2 of the side post 15 at the position corresponding to the second flange portion 26 in the same direction. Therefore, a difference in section modulus between a portion, corresponding to the pier panel 5, of the side post 15 and a portion, corresponding to the wainscot panel 6, of the side post 15 is suppressed. On this account, constant out-of-plane rigidity of the frieze board 7, the pier panel 5, and the wainscot panel 6 can be secured. In addition, in bending processing of the side post 15 for forming the curved portion 15a, processing accuracy regarding torsion and the like improves.

The curved portion 15a of the side post 15 includes a surface (outer surface of the web portion 22) opposed to the car longitudinal direction end surfaces of the second lateral bones 12 and 13, and the side post 15 does not include cutout portions through which the second lateral bones 12 and 13 pass in the car longitudinal direction. Therefore, variations in section modulus of the side post 15 at the curved portion 15a are suppressed, and the processing accuracy in the bending processing of the side post 15 improves.

One of the first flange portions 23 is joined to one of car longitudinal direction end portions of the pier panel 5, and the other first flange portion 23 is joined to the other car longitudinal direction end portion of the pier panel 5. Therefore, one side post 15 is joined to one pier panel 5, and man-hours of joining work can be reduced from the viewpoint of a continuous work property. In addition, although the side post 15 is wide, i.e., the side post 15 spreads from one of the car longitudinal direction end portions of the pier panel 5 to the other car longitudinal direction end portion, the top portion 21 of the side post 15 includes the first to third regions 21a to 21c. Therefore, the bending strength of the side post 15 can be adequately secured by the sectional shape of the top portion 21.

Since the top portion 21 of the side post 15 includes the first to third regions 21a to 21c, the strength of the top portion 21 is satisfactorily kept. Therefore, the opening P1 through which the welding electrode E passes when the reinforcing plate 16 arranged in the internal space S formed by the side post 15 and the outer plate 2 is welded to the outer plate 2 can be formed at the top portion 21. At this time, since the opening P1 is formed on the virtual straight line VL1 extending in the direction perpendicular to the outer plate 2 through the portion where the reinforcing plate 16 and the outer plate 2 are to be joined to each other, the use of a single electrode is adequate without complicating the welding electrode E. Therefore, the welding can be automated. Further, since the reinforcing plate 16 is first assembled to the side post 15, the side post 15 and the reinforcing plate 16 are welded to the outer plate 2 through a single step. Therefore, an assembly work property improves.

The side post 15 is spaced apart from the first lateral bones 10 and 11 at the cutout portions 24 and 25. Therefore, even when the second flange portions 26 of the side post 15 are joined to the wainscot panel 6, the side post 15 do not interfere with the first lateral bones 10 and 11 intersecting with the side post 15. On this account, permissible ranges of dimension errors of the side post 15 and the first lateral bones 10 and 11 increase. Thus, processing work properties of the side post 15 and the first lateral bones 10 and 11 can be improved, and defective products and the like can be reduced.

The present invention is not limited to the above embodiment, and modifications, additions, and eliminations may be made with respect to the configuration of the present invention. For example, instead of the welding electrode E which passes through the openings P1 and P2 when joining the reinforcing plate 16 and the first lateral bones 10 and 11 to the outer plate 2, a laser for laser welding or a tool for friction stir joining may be used. The numbers of lateral bones, cutout portions, and flange portions are not limited to the above numbers and are any numbers. The first regions 21a and the second region 21b do not have to be parallel to the outer plate 2, and the third region 21c do not have to be perpendicular to the outer plate 2. The sectional shapes of the first to third lateral bones 10 to 14 are not limited to the above shapes and may be any shapes. The bone structure 3 may include openings for weight reduction in addition to the openings shown in the drawings.

REFERENCE SIGNS LIST 1 side bodyshell
2 outer plate
3 bone structure
4 window opening
5 pier panel
6 wainscot panel 10, 11 first lateral bone
12, 13 second lateral bone
15 side post
15a curved portion
16 reinforcing plate
21 top portion
21a first region
21b second region
21c third region
22 web portion
23 first flange portion
24, 25 cutout portion
26 second flange portion
P1, P2 opening
S internal space
VL1, VL2 virtual straight line

The invention claimed is:

1. A bone structure of a railcar,
the bone structure being joined to an outer plate,
the outer plate comprising:
 a pair of window openings;
 a pier panel located between the window openings; and
 a wainscot panel located under the window openings and the pier panel and extending in a car longitudinal direction,
the bone structure comprising:
 a pair of first lateral bones arranged at an inner side of the wainscot panel in a car width direction and extending in the car longitudinal direction, the first lateral bones being joined to the wainscot panel;
 a second lateral bone arranged at the inner side of the wainscot panel in the car width direction and extending in the car longitudinal direction, the second lateral bone being joined to the wainscot panel; and
 a side post arranged at an inner side of the pier panel in the car width direction and extending in a car upper-lower direction, the side post intersecting with the first lateral bones, wherein
the side post includes:
 at least one first flange portion joined to the pier panel;
 a pair of cutout portions located at positions corresponding to the wainscot panel, the first lateral bones passing through respective ones of the cutout portions in the car longitudinal direction;
 at least one second flange portion arranged between the first lateral bones and joined to the wainscot panel; and
 a curved portion that is located at a position corresponding to the wainscot panel and curved when viewed from the car longitudinal direction,
a height of the side post at a position corresponding to the first flange portion in a first direction, perpendicular to the outer plate at a first portion of the outer plate, is equal to a height of the side post at a position corresponding to the second flange portion in a second direction perpendicular to a second portion of the outer plate,
the second lateral bone is arranged at a position corresponding to the curved portion, and
the curved portion of the side post includes a surface opposed to a car longitudinal direction end surface of the second lateral bone.

2. The bone structure according to claim 1, wherein:
the at least one first flange portion includes a pair of first flange portions located away from each other in the car longitudinal direction;
at a position corresponding to the pier panel, the side post further includes
 a top portion located away from the outer plate inward in the car width direction and extending along the outer plate and
 a pair of web portions extending from the top portion and connected to respective ones of the first flange portions;
the top portion includes
 a pair of first regions connected to respective ones of the web portions,
 a second region arranged between the first regions and located closer to the outer plate than the first regions, and
 a pair of third regions connecting respective ones of the first regions to the second region; and
one of the first flange portions is joined to one of car longitudinal direction end portions of the pier panel, and the other first flange portion is joined to the other car longitudinal direction end portion of the pier panel.

3. The bone structure according to claim 2, further comprising a reinforcing plate arranged in a space formed by the side post and the outer plate, the reinforcing plate being joined to the pier panel by welding, wherein
the first regions and the second region include openings formed on virtual straight lines each extending in a direction perpendicular to the pier panel through a portion at which the reinforcing plate and the pier panel are to be joined to each other.

4. The bone structure according to claim 1, wherein the side post is spaced apart from the first lateral bones at the cutout portions.

5. A side bodyshell of a railcar,
the side bodyshell comprising:
 the bone structure according to claim 1; and
 the outer plate to which the bone structure is joined, wherein
the first lateral bones and the side post are joined to the outer plate from an inner side of the outer plate in the car width direction.

6. The side bodyshell according to claim 5, wherein:
the outer plate includes a plurality of pier panels including the pier panel;
the bone structure includes a plurality of side posts including the side post, the plurality of side posts being arranged respective ones of the pier panels arranged at intervals in the car longitudinal direction; and
each of the first lateral bones passes through the cutout portions of the side posts.

* * * * *